J. Dill,

Dovetailing Machine.

No. 106,922. Patented Aug. 30, 1870.

Witnesses:
Geo. W. McGill
H. G. Muldrum

Inventor:
Joseph Dill
By Alex. A. C. Kauckert
his Attorneys

United States Patent Office.

JOSEPH DILL, OF GRAND RAPIDS, MICHIGAN.

Letters Patent No. 106,922, dated August 30, 1870.

IMPROVEMENT IN DOVETAILING-MACHINE.

The Schedule referred to in these Letters Patent and making part of the same.

*To all whom it may concern:*

Be it known that I, JOSEPH DILL, of Grand Rapids, in the county of Kent and State of Michigan, have invented a new and useful Improvement in Grooving and Dovetailing-Machines; and I do hereby declare the following to be a clear and correct description of the same, sufficient to enable others skilled in the class to which my invention appertains to fully understand and use the same, reference being had to the accompanying drawing which makes part of this specification, and in which—

Like letters of reference indicate like parts in both figures.

Figure 1:
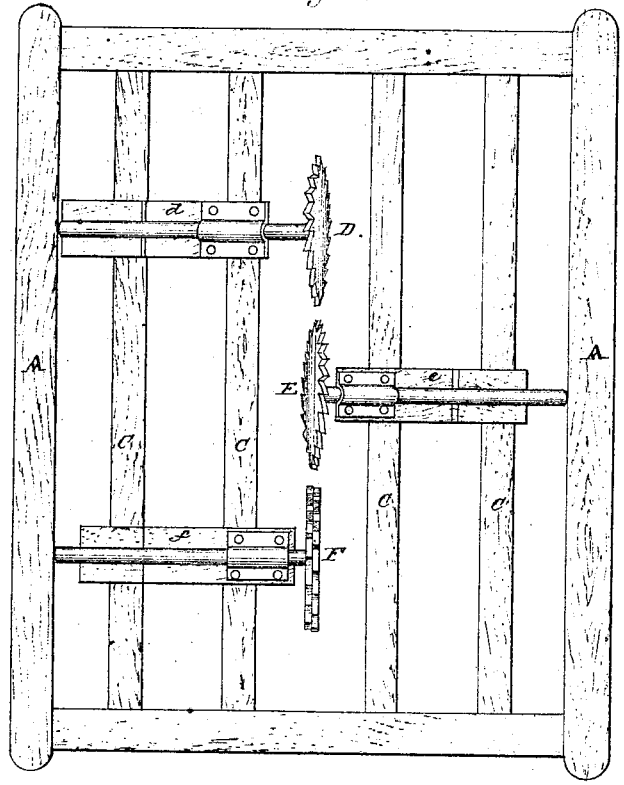
Figure 1 is a plan view of my improved machine with the carriage removed.
Figure 2:
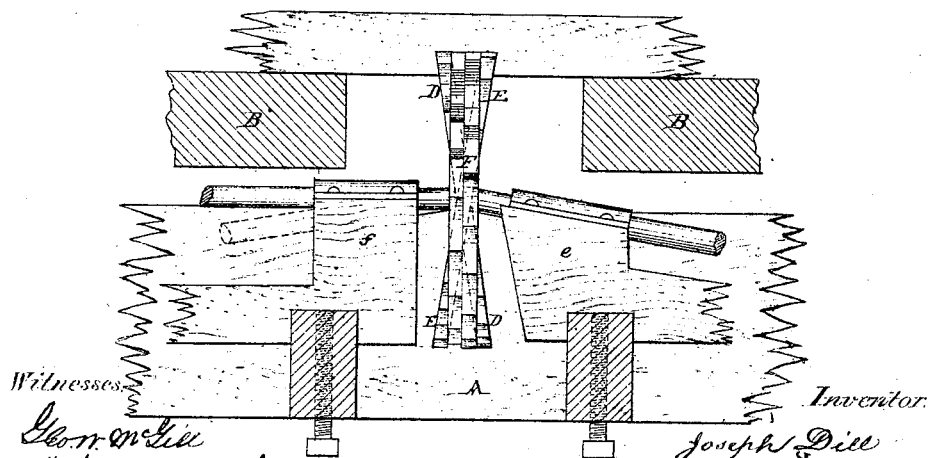
Figure 2 is an end view of the same with the carriage in place.

The nature of my invention consists in the arrangement of three circular saws, placed one behind the other, their centers being in the same horizontal line, two of the saws being in an inclined position, and having the cutting-edges of their teeth beveled, to run parallel with the cutting-edges of the the teeth of the third saw, which is vertical, and consists of one or a set of several saws, as may be required by the width of the dovetail groove to be cut.

A in the drawing represents the frame of the machine, on which the carriage B slides in the usual manner.

Longitudinal pieces C C, suitably fastened to the frame A, are provided with slots, in which slide the bearings $d\ e\ f$ of the circular saws D E F, which bearings, besides being made adjustable laterally, may be adjustable vertically, also, by set-screws, or any other well-known devices.

The bearings of saws D and E are inclined in opposite directions, so that the saws are themselves inclined to the same degree, but in opposite directions.

The cutting-edges of these saws are beveled off, so as to be parallel to the cutting-edges of saw F, which latter hangs perfectly perpendicular, or as nearly so as in practice can be accomplished. This latter saw F may consist of one single saw, or a set of several saws, as may be required for the width of the dovetail groove.

Thus, I am enabled to make any sized groove, from one-sixteenth, or even a thirty-second part of an inch, to two inches or more, merely varying the size or number of saws F.

Were the saws placed in line, side by side, they would cut too wide a groove for any practical use, and could not possibly make a small dovetail groove for fine work.

I am aware of a patent granted to C. Ohlemacher and O. Kromer, dated March 9, 1869, in which three saws cut a complete dovetail, and this I do not claim; but

What I claim as new, and desire to secure by Letters Patent, is—

The arrangement of the circular saws D E F, when constructed and operating as herein shown and described.

JOSEPH DILL.

Witnesses:
 BENJAMIN A. WILLIS,
 HENRY WHITTAKER, Jr.